(12) United States Patent
Kato

(10) Patent No.: US 6,894,422 B2
(45) Date of Patent: May 17, 2005

(54) ULTRASONIC-MOTOR CONTROL SYSTEM

(75) Inventor: Tetsuaki Kato, Saitama (JP)

(73) Assignee: PENTAX Corporation, Tokyo (JP)

( * ) Notice: Subject to any disclaimer, the term of this patent is extended or adjusted under 35 U.S.C. 154(b) by 168 days.

(21) Appl. No.: 10/034,391

(22) Filed: Jan. 3, 2002

(65) Prior Publication Data

US 2002/0089257 A1 Jul. 11, 2002

(30) Foreign Application Priority Data

Jan. 9, 2001 (JP) .......................................... 2001-001462

(51) Int. Cl.[7] .............................................. H01L 41/08
(52) U.S. Cl. ................................................. 310/323.03
(58) Field of Search ................................ 310/316–317, 310/323, 328; 318/116; H01L 41/08; H02N 2/00

(56) References Cited

U.S. PATENT DOCUMENTS

| | | | | |
|---|---|---|---|---|
| 4,743,788 A | * | 5/1988 | Takagi et al. .......... | 310/316.02 |
| 4,833,358 A | * | 5/1989 | Suzuki et al. .......... | 310/316.02 |
| 5,146,143 A | * | 9/1992 | Furutsu .................. | 310/316.02 |
| 5,500,578 A | * | 3/1996 | Kawamura ............. | 310/316.02 |
| 5,874,799 A | * | 2/1999 | Mitarai et al. ......... | 310/316.01 |
| 6,238,336 B1 | * | 5/2001 | Ouchi ........................ | 600/160 |

FOREIGN PATENT DOCUMENTS

JP  7-227089  8/1995

* cited by examiner

*Primary Examiner*—Darren Schuberg
*Assistant Examiner*—Karen Beth Addison
(74) *Attorney, Agent, or Firm*—Greenblum & Bernstein, P.L.C.

(57) ABSTRACT

An ultrasonic-motor control system includes an ultrasonic motor, a controller which starts the ultrasonic motor by changing a drive frequency of the ultrasonic motor from an initial drive frequency, a calculation device which calculates an initial drive frequency data based on a drive frequency at the commencement of rotation of the ultrasonic motor, and a setting device which sets the initial drive frequency based on the initial drive frequency data at a subsequent commencement of driving of the ultrasonic motor.

17 Claims, 12 Drawing Sheets

ULTRASONIC-MOTOR CONTROL SYSTEM

BACKGROUND OF THE INVENTION

1. Field of the Invention

The present invention relates to an ultrasonic-motor control system which controls the drive frequency of a voltage applied to piezoelectric ceramic elements of an ultrasonic motor.

2. Description of the Related Art

In rotary disc type ultrasonic motors, a stator is composed of an elastic body and piezoelectric ceramic elements which are adhered to the elastic body. The piezoelectric ceramic elements are polarized in the direction of the thickness thereof to thereby cause alternate expansion and shrinkage as voltage is applied. This causes bending oscillation at the surface of the elastic body. As the different voltage phases (SIN and COS waves) are applied to each electrode of the piezoelectric ceramic elements, the resulting waves are combined to form a progressive wave (traveling wave) on the surface of the elastic body. With pressure applied on the rotor, rotational motion in the opposite direction of the progressive wave is generated as a result of frictional force between the stator and the rotor. In this type of ultrasonic motor, it is known that the drive efficiency of the motor improves as the rotational speed becomes maximum if the motor is driven at the resonance frequency thereof.

Accordingly, in the case of driving the ultrasonic motor with the resonance frequency, the drive frequency of the ultrasonic motor is conventionally controlled in the following manner: a starting frequency is set to be sufficiently higher than the resonance frequency of the ultrasonic motor, and subsequently the drive frequency is gradually decreased until it reaches the resonance frequency. Upon reaching the resonance frequency, the drive frequency is fixed, and is finely adjusted so as to maintain the resonance frequency. This control is performed because the resonance frequency (i.e., the optimum drive frequency) of the ultrasonic motor varies due to a variation in the ambient temperature and/or a variation in the load acting on the ultrasonic motor. In addition, the drive frequency of the ultrasonic motor needs to be decreased gradually from a sufficiently high frequency on the assumption that the resonance frequency would shift toward the high frequency side due to some cause.

However, in the case where resonance frequency shifts toward the low frequency side in a normal state or due to some cause, it takes a long time before the ultrasonic motor starts rotating if the sweep operation of the drive frequency of the ultrasonic motor starts from a sufficiently high frequency in a conventional fashion. This becomes a leading cause of a substantial delay in the response of the ultrasonic motor.

SUMMARY OF THE INVENTION

An object of the present invention is to provide an ultrasonic-motor control system which makes it possible to ensure a quick response and stable operation of an ultrasonic motor even if the resonance frequency thereof varies.

To achieve the object mentioned above, according to an aspect of the present invention, an ultrasonic-motor control system is provided, including an ultrasonic motor, a controller which starts the ultrasonic motor by changing a drive frequency of the ultrasonic motor from an initial drive frequency, a calculation device which calculates an initial drive frequency data based on a drive frequency at the commencement of rotation of the ultrasonic motor, and a setting device which sets the initial drive frequency based on the initial drive frequency data at a subsequent commencement of driving of the ultrasonic motor.

The controller can start the ultrasonic motor by reducing a drive frequency of the ultrasonic motor from an initial drive frequency.

Preferably, the ultrasonic-motor control system further includes a frequency data storing device in which a drive frequency at the commencement of rotation of the ultrasonic motor is stored as starting frequency data each time the ultrasonic motor starts. The calculation device calculates an average of all the starting frequency data stored in the frequency data storing device, and calculates the initial drive frequency data using the average.

In an embodiment, the frequency data storing device stores a resonance frequency data of the ultrasonic motor; and the calculation device utilizes the resonance frequency data to calculate a value which is added to the average in order to obtain the initial drive frequency data.

In an embodiment, each time a rotational speed of the ultrasonic motor reaches a maximum rotational speed, the frequency data storing device stores a drive frequency as the resonance frequency data.

Preferably, the initial drive frequency data is greater than the average by a predetermined ratio.

In an embodiment, the setting device sets the initial drive frequency to a maximum value in a controllable frequency range of the controller in the case where none of the starting frequency data is stored in the frequency data storing device.

In an embodiment, in the case where the ultrasonic motor does not start though the controller decreases the drive frequency of the ultrasonic motor to a minimum frequency in a controllable frequency range of the controller, the controller clears all the starting frequency data stored in the frequency data storing device, and the setting device sets the initial drive frequency to a maximum value in a controllable frequency range of the controller.

Preferably, the ultrasonic-motor control system further includes a rotational speed determining device which determines a rotational speed of the ultrasonic motor, upon a predetermined time elapsing from the commencement of rotation of the ultrasonic motor, each time the ultrasonic motor starts; a rotational speed storing device in which the rotational speed is stored as speed data, wherein at least a previous speed data and a current speed data are stored in the rotational speed storing device; and a determining device which determines whether a speed-data difference between the previous speed data and the current speed data is one of equal to and greater than a predetermined value. The controller clears all the starting frequency data stored in the frequency data storing device in the case where the determining device determines that the speed-data difference is one of equal to and greater than the predetermined value.

In an embodiment, the ultrasonic-motor control system further includes a temperature sensor for sensing an ambient temperature of the ultrasonic motor before each time the controller starts the ultrasonic motor; and a temperature data storing device in which the ambient temperature is stored as temperature data, wherein at least a previous temperature data and a current temperature data are stored in the temperature data storing device. The determining device determines whether a temperature-data difference between the previous temperature data and the current temperature data is one of equal to and greater than a predetermined value, wherein the controller clears all the starting frequency data stored in the frequency data storing device in the case where the determining device determines that the temperature-data difference is one of equal to and greater than the predetermined value.

In an embodiment, the setting device sets the initial drive frequency to a maximum value in a controllable frequency range of the controller in the case where none of the starting frequency data is stored in the frequency data storing device.

Preferably, the ultrasonic-motor control system includes a temperature sensor for sensing an ambient temperature of the ultrasonic motor before each time the controller starts the ultrasonic motor; a temperature data storing device in which the ambient temperature is stored as temperature data, wherein at least a previous temperature data and a current temperature data are stored in the temperature data storing device; and a determining device which determines whether a difference between the previous temperature data and the current temperature data is one of equal to and greater than a predetermined value. The controller clears all the starting frequency data stored in the frequency data storing device in the case where the determining device determines that the difference is one of equal to and greater than the predetermined value.

In an embodiment, the setting device sets the initial drive frequency to a maximum value in a controllable frequency range of the controller in the case where none of the starting frequency data is stored in the frequency data storing device.

In an embodiment, the initial drive frequency data is stored in the frequency data storing device.

In an embodiment, the frequency data storing device stores the current starting frequency data and a predetermined number of previous starting frequency data.

In an embodiment, the setting device compares the calculated initial drive frequency with a maximum drive frequency in a controllable frequency range of the controller, and the setting device sets the initial drive frequency to the maximum drive frequency in the case where the calculated initial drive frequency is higher than the maximum drive frequency.

Preferably, the ultrasonic-motor control system is incorporated in a camera system.

The present disclosure relates to subject matter contained in Japanese Patent Application No.2001-1462 (filed on Jan. 9, 2001) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
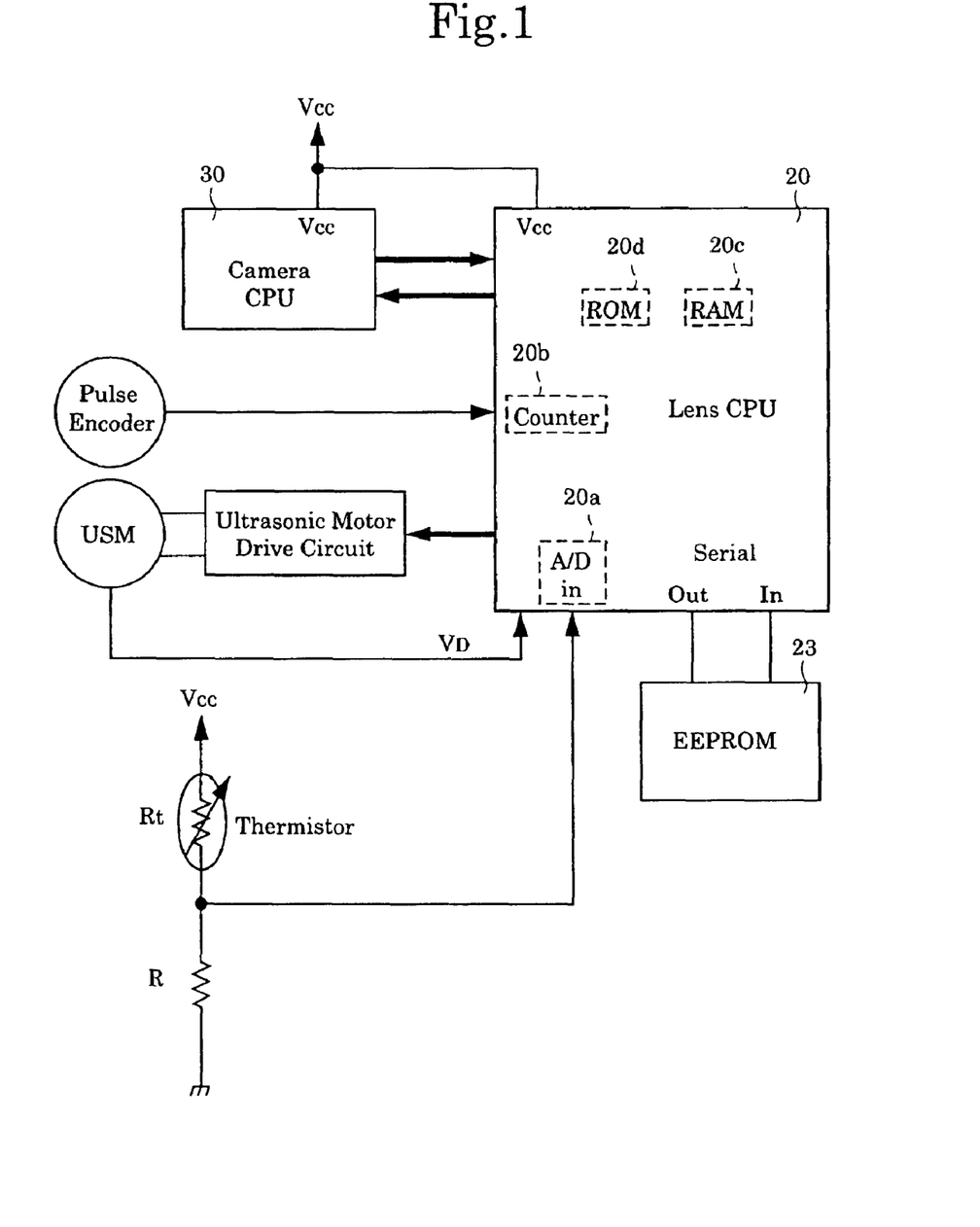
FIG. 1 is a block diagram of an embodiment of an ultrasonic-motor control system, which is incorporated in a camera system, according to the present invention.

FIG. 1 shows an embodiment of an ultrasonic-motor control system, which is incorporated in a camera system, according to the present invention. In this embodiment, the drive frequency of a voltage (i.e., the frequency of a drive frequency signal) applied to an ultrasonic motor (USM) 10 for driving an AF lens group of an autofocus camera system (i.e., the drive frequency of the ultrasonic motor 10 for driving the AF lens group) is controlled by the ultrasonic-motor control system.

Although the structure of the ultrasonic motor 10 is not shown in the drawings, the ultrasonic motor 10 is provided with a stator which is composed of an elastic body and piezoelectric ceramic elements which are adhered to the elastic body, and a rotor (dynamic body) which is pressed against the stator. If the voltage having two phases with spatial and phase difference of 90 degrees is applied to the piezoelectric ceramic elements, a progressive wave of flexural vibration is produced, and rotational motion in the opposite direction of the progressive wave is generated as a result of frictional force between the stator and the rotor.

Figure 8A:
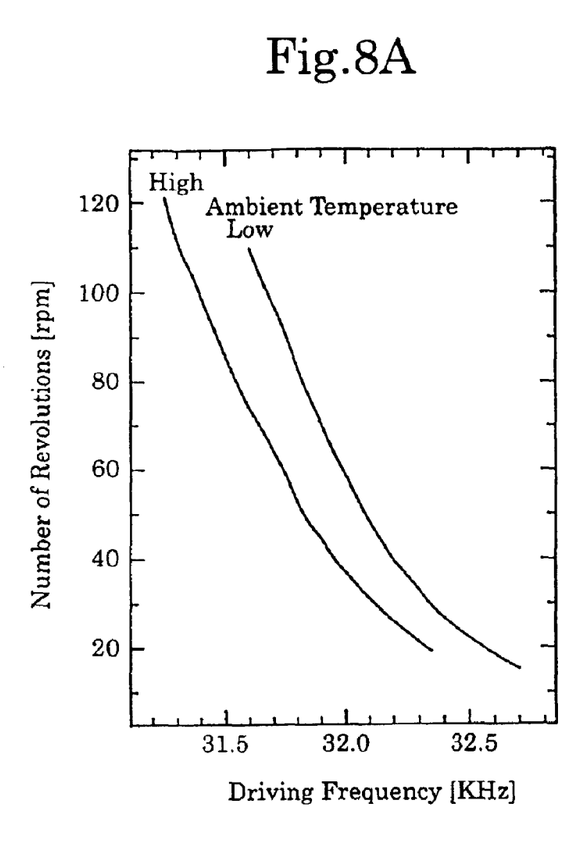
FIG. 8A is a graph showing the correlation between the drive frequency of the ultrasonic motor and the number of revolutions in different ambient temperatures.
Figure 8B:
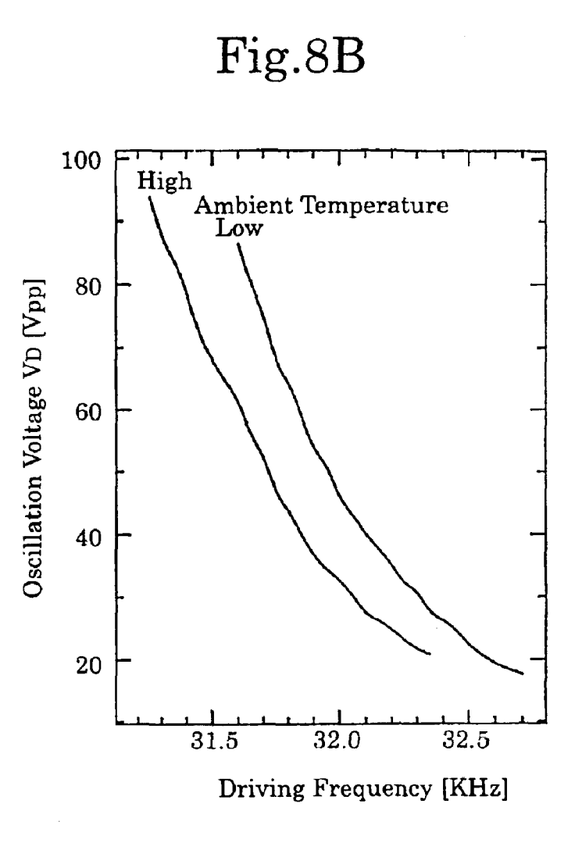
FIG. 8B is a graph showing the correlation between the drive frequency of the ultrasonic motor and an oscillation voltage in different ambient temperatures.

The ultrasonic motor 10 is provided with a sensor electrode S. The sensor electrode S detects an oscillation voltage $V_D$ whose amplitude is proportional to that of the stator of the ultrasonic motor 10 when a flexural vibration is produced on the stator. Namely, the ultrasonic motor 10 outputs a signal (the oscillation voltage $V_D$) whose oscillation frequency corresponds to the drive frequency of the ultrasonic motor 10 from the sensor electrode S. FIG. 8A shows a graph showing the correlation between the drive frequency of the ultrasonic motor 10 and the number of revolutions (rpm) of the ultrasonic motor 10, while FIG. 8B shows a graph showing the correlation between the drive frequency of the ultrasonic motor 10 and the oscillation voltage $V_D$.

The present embodiment of the ultrasonic-motor control system is provided with a lens CPU (controller/calculation device/setting device/rotational speed determining device/determining device) 20. The lens CPU 20 communicates with a camera CPU 30, and operates in accordance with control signals input from the camera CPU 30. Such control signals include a signal which defines a drive commencement command and a signal which defines the amount of driving of the ultrasonic motor 10 (i.e., the number of drive pulses of the ultrasonic motor 10).

The lens CPU 20 is provided therein with a ROM 20*d* in which various control programs are stored, a RAM 20*c* in which various control data are temporarily stored, an A/D conversion input port 20*a* and a counter 20*b*. The lens CPU 20 operates with power supplied from a power source Vcc of the camera system. The A/D conversion input port 20*a* is connected to the junction of a thermistor Rt and a resistor R. The thermistor Rt serves as a temperature sensor, and the resistance value of the thermistor Rt varies in accordance with a variation in the ambient temperature. The lens CPU 20 detects the ambient temperature in accordance with the input level of the A/D conversion input port 20*a*. The counter 20*b* counts down each time it inputs a pulse which is output from a pulse encoder 21 in accordance with the amount of rotation of the ultrasonic motor 10. The lens CPU 20 controls the deceleration and the stopping of the ultrasonic motor 10 in accordance with the value of the counter 20*b*. At the same time, the lens CPU 20 determines the rotational speed of the ultrasonic motor 10 in accordance with the amount of variation in the value of the counter 20*b* within a predetermined period of time. The lens CPU 20 controls the acceleration driving and the constant-speed driving of the ultrasonic motor 10 in accordance with the oscillation voltage $V_D$.

A ultrasonic motor drive circuit 22 and an EEPROM (frequency data storing device/rotational speed storing device/temperature data storing device) 23 serving as a non-volatile memory are connected to the lens CPU 20. The ultrasonic motor drive circuit 22 supplies an AC signal having a frequency corresponding to a command issued by the lens CPU 20 to the ultrasonic motor 10. The EEPROM 23 serves as memory for storing various data therein. The lens CPU 20 reads and writes data from and to the EEPROM 23 as needed.

The general outline of the motor-drive controlling operations performed by the lens CPU 20 will be hereinafter discussed based on the above described structure of the ultrasonic-motor control system.

The lens CPU 20 supplies a voltage having a drive frequency corresponding to an initial drive frequency data finit of the ultrasonic motor 10, and gradually decreases the drive frequency from the initial drive frequency. At the moment the ultrasonic motor 10 starts rotating, the current starting frequency data fscur which is the drive frequency at the commencement of rotation of the ultrasonic motor 10 is stored in the EEPROM 23, and subsequently the lens CPU 20 further decreases the drive frequency to accelerate the ultrasonic motor 10. Subsequently, immediately after the oscillation voltage $V_D$ detected by the sensor electrode S reaches a prescribed voltage, the drive frequency at this time is stored as a resonance frequency data fr in the EEPROM 23 to drive the ultrasonic motor 10 at the maximum speed at the stored frequency. Subsequently, immediately after the ultrasonic motor 10 is driven by a predetermined amount of rotation, the speed of the ultrasonic motor 10 is reduced to stop the ultrasonic motor 10, and then the initial drive frequency data finit for the subsequent driving operation of the ultrasonic motor 10 is determined in accordance with starting frequency data fs[n] and the resonance frequency data fr. It should be noted that "n" of the aforementioned "fs[n]" is a variable which indicates the number of starting frequency data stored in the EEPROM 23. The determined initial drive frequency data finit is stored in the EEPROM 23 so as to be read out therefrom at the subsequent driving operation of the ultrasonic motor 10. With the initial drive frequency data finit stored in EEPROM 23, the lens CPU 20 controls the driving of the ultrasonic motor 10 in the above described manner.

The main characteristic of the present embodiment is the calculation (setting) of the initial drive frequency data finit. Namely, the initial drive frequency data finit is determined based on the previous data stored in the EEPROM 23, which is greater than the resonance frequency of the ultrasonic motor 10 so that the starting time of the ultrasonic motor 10 becomes minimal. According to the determination of the initial drive frequency data finit, the ultrasonic motor 10 can be started at drive frequency higher than the resonance frequency, and also can be driven with stability after startup of the ultrasonic motor 10. In addition, a reduction in the starting time of the ultrasonic motor 10 makes it possible to improve the response of the ultrasonic motor 10. Although it is known in the art that the performance of an ultrasonic motor deteriorates drastically if the drive frequency becomes lower than the resonance frequency, such a problem never occurs in the present embodiment.

In the present embodiment, if the variation of the ambient temperature and/or the load acting on the ultrasonic motor 10 has become greater than a predetermined value since the previous driving time, all the data on the ultrasonic motor 10 such as the starting frequency data fs[n] and the initial drive frequency data finit which are stored in the EEPROM 23 are cleared because it is considered that the resonance frequency of the ultrasonic motor 10 may have varied. In addition, if no data on the ultrasonic motor 10 is in the EEPROM 23, the initial drive frequency data finit is set to the maximum value in consideration of the case where the resonance frequency of the ultrasonic motor 10 may shift to the high frequency side. This makes it possible to ensure the startup and the stable driving of the ultrasonic motor 10 even if the resonance frequency thereof varies.

The motor-drive controlling operations performed by the lens CPU 20 will be further discussed in detail with reference to the flow charts shown in FIGS. 2 through 6. Main process shown in FIG. 2 starts immediately after the power of the camera is turned ON. In the ON state of the power of the camera, operations at steps S13 through S19 are repeated.

Figure 2:
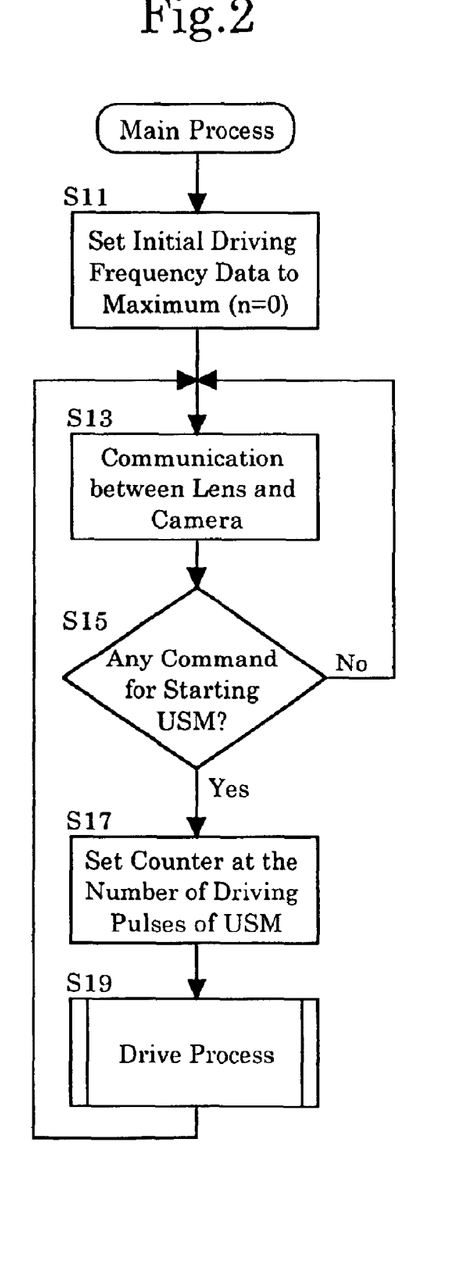
FIG. 2 is a flow chart for a main process of the ultrasonic-motor control system shown in FIG. 1.

In the main process, firstly all the starting frequency data fs[n] stored in the EEPROM 23 are cleared (n=0), while the initial drive frequency data finit is set to the maximum value in a predetermined controllable frequency range of the lens CPU 20 (step S11). The initial drive frequency data finit is a drive frequency of a voltage (drive voltage) when the lens CPU 20 starts supplying the voltage to the piezoelectric ceramic elements of the ultrasonic motor 10.

Subsequently, communications are carried out between the lens CPU 20 and the camera CPU 30 (step S13), and subsequently it is determined whether a command to start the ultrasonic motor 10 has been input to the lens CPU 20 from the camera CPU (step S15). If a command to start the ultrasonic motor 10 has not yet been input (if NO at step S15), control returns to step S13 to repeat the operations at steps S13 and S15 until a command to start the ultrasonic motor 10 has been input to the lens CPU 20. If a command to start the ultrasonic motor 10 has been input (if YES at step S15), the counter 20*b* is set to the number of drive pulses of the ultrasonic motor 10 which has been set in the camera body (step S17). Subsequently, a drive process ("DRIVE" shown in FIG. 3) is performed (step S19).

The drive process will be hereinafter discussed in detail with reference to the flow chart shown in FIG. 3. In this process, firstly a ultrasonic motor start process ("USM START" shown in FIGS. 4A and 4B) is performed to start the ultrasonic motor 10 (step S21). Upon the commencement of rotation of the ultrasonic motor 10, the drive frequency is further decreased to accelerate the ultrasonic motor 10 (step S23). In the driving operation of the ultrasonic motor 10, the drive frequency of the ultrasonic motor 10 is gradually reduced from the initial drive frequency data finit. Subsequently, upon the drive frequency sweep operation starting, CPU 20 determines that the ultrasonic motor 10 has started rotating when the output of the pulse encoder 21 is first detected.

Subsequently, the drive frequency at the moment the oscillation voltage $V_D$, which is detected by the sensor electrode S, reaches a prescribed voltage is stored as a resonance frequency data fr in the EEPROM 23 (S25), and the drive frequency is kept at the stored resonance frequency in order to drive the ultrasonic motor 10 at a constant speed (step S27). Each of the accelerating driving operation and the constant driving operation at steps S23 and S27 are controlled in accordance with the oscillation voltage $V_D$, but will not be hereinafter discussed in detail since they have no direct bearing on the present invention. Subsequently, upon completion of driving of the ultrasonic motor 10 by a predetermined period of time or a predetermined number of pulses at a constant speed, the rotational speed of the ultrasonic motor 10 is reduced in accordance with the value of the counter 20b to stop the ultrasonic motor 10 at the time the value of the counter 20b reaches 0 (step S29). Subsequently, an initial drive frequency calculation process ("INITIAL DRIVE FREQUENCY CALCULATION" shown in FIG. 6) is performed (step S31). In this process, the initial drive frequency data finit for the subsequent driving operation of the ultrasonic motor 10 is calculated and stored in the EEPROM 23. After the initial drive frequency calculating process is performed, control returns to the main process.

The ultrasonic motor start process will be hereinafter discussed in detail with reference to the flow chart shown in FIGS. 4A and 4B. In the ultrasonic motor start process, firstly the current ambient temperature is detected from the input level of the A/D conversion input port 20a (step S41), and is stored in the EEPROM 23 (step S43). Subsequently, it is determined whether the variable n, which indicates the number of the starting frequency data stored in the EEPROM 23, is greater than zero (step S45). If the variable n is not greater than zero (if NO at step S45), the initial drive frequency data finit is set to the maximum in the controllable frequency range (step S47), and control proceeds to step S57. If the variable n is greater than zero (if YES at step S45), the previously detected ambient temperature and the current detected ambient temperature are read out of the EEPROM 23 to determine whether the difference between the absolute value of the previously detected ambient temperature and the absolute value of the current detected ambient temperature is equal to or greater than a predetermined value (CONST) (step S49). If the above-mentioned difference is smaller than the predetermined value (if NO at step S49), the initial drive frequency data finit is read from the EEPROM 23 to be set (step S51), and control proceeds to step S57. In this case, the driving of the ultrasonic motor 10 is configured to start at the initial drive frequency which has been determined at the previous driving of the ultrasonic motor 10 because the current environmental factors such as ambient temperature of the current driving of the ultrasonic motor 10 are considered substantially identical to the previous environmental factors. This control makes it possible to start driving the ultrasonic motor 10 at a drive frequency which is close to and higher then, the resonance frequency of the ultrasonic motor 10, and also to reduce the starting time of the ultrasonic motor 10. On the other hand, if the above-mentioned difference is equal to or greater than the predetermined value (if YES at step S49), this means that the ambient temperature has varied substantially from the time of the previous driving of the ultrasonic motor 10. In this case, it is possible that the resonance frequency of the ultrasonic motor 10 may vary substantially. Accordingly, if the above-mentioned difference is equal to or greater than the predetermined value (if YES at step S49), the initial drive frequency data finit is set to the maximum value in the controllable frequency range (step S53), and subsequently all the starting frequency data fs[n] stored in the EEPROM 23 are cleared (n=0) (step S55). Subsequently control proceeds to step S57.

At step S57 a voltage having drive frequency corresponding to the initial drive frequency data finit is applied to the ultrasonic motor 10 via the ultrasonic motor drive circuit 22. Subsequently, it is determined whether the ultrasonic motor 10 has started rotating according to whether or not the output of the pulse encoder 21 has been detected (step S59). It is determined that the ultrasonic motor 10 has started rotating when the output of the pulse encoder 21 is firstly detected after a voltage is applied to the ultrasonic motor 10. If the ultrasonic motor 10 has not started rotating yet (if NO at step S59), it is determined whether the current drive frequency is the minimum frequency in the controllable frequency range (step S61). If the current drive frequency is not the minimum frequency (if NO at step S61), the drive frequency is decreased by a predetermined value (step S63) and control returns to step S59. Accordingly, the operations at steps S59, S61 and S63 are repeated to perform the drive frequency sweep operation until the drive frequency is a minimum value as long as it is determined at step S59 that the ultrasonic motor 10 has not yet started rotating. If the drive frequency reaches the minimum frequency in the controllable frequency range before the ultrasonic motor 10 starts rotating (if YES at step S61), all the starting frequency data fs[n] stored in the EEPROM 23 are cleared (n=0) (step S65), and subsequently the current starting frequency fscur is set to the maximum frequency in the controllable frequency range (step S67). Subsequently, control proceeds to step S77.

Immediately after the ultrasonic motor 10 starts rotating (if YES at step S59), the initial driving frequency is set as the current starting frequency (step S68), and the current rotational speed of the ultrasonic motor 10 is determined from a variation in the value of the counter 20b within a predetermined amount of time (step S69). Subsequently the determined current rotational speed is stored in the EEPROM 23 (step S71), and it is determined whether the variable n is greater than zero (step S73). If the variable n is greater than zero (if YES at step S73), the previously detected ambient temperature and the current detected ambient temperature are read out of the EEPROM 23 to determine whether the difference between the absolute value of the previous speed and the absolute value of the current speed is equal to or greater than a predetermined value (CONST) (step S75). If the above-mentioned difference is equal to or greater than the predetermined value (if YES at step S75), this means that the load acting on the ultrasonic motor 10 has varied substantially. In this case, it is possible that the resonance frequency of the ultrasonic motor 10 may vary substantially. Accordingly, if the above-mentioned difference is equal to or greater than the predetermined value (if YES at step S75), all the starting frequency data fs[n] stored in the EEPROM 23 are cleared (n=0) (step S65), and subsequently the current starting frequency fscur is set as the maximum frequency in the controllable frequency range (step S67). Thereafter, control proceeds to step S77. If the variable n is equal to or smaller than zero (if NO at step S73) or if the above-mentioned difference is smaller than the predetermined value (if NO at step S75), control proceeds to step S77 since the previous data can be utilized. At step S77, a starting frequency storing and average value calculating process ("STARTING FREQUENCY STORING & AVERAGE VALUE CALCULATION" shown in FIG. 5) is performed, and control returns to the drive process shown in FIG. 3.

Figure 5:
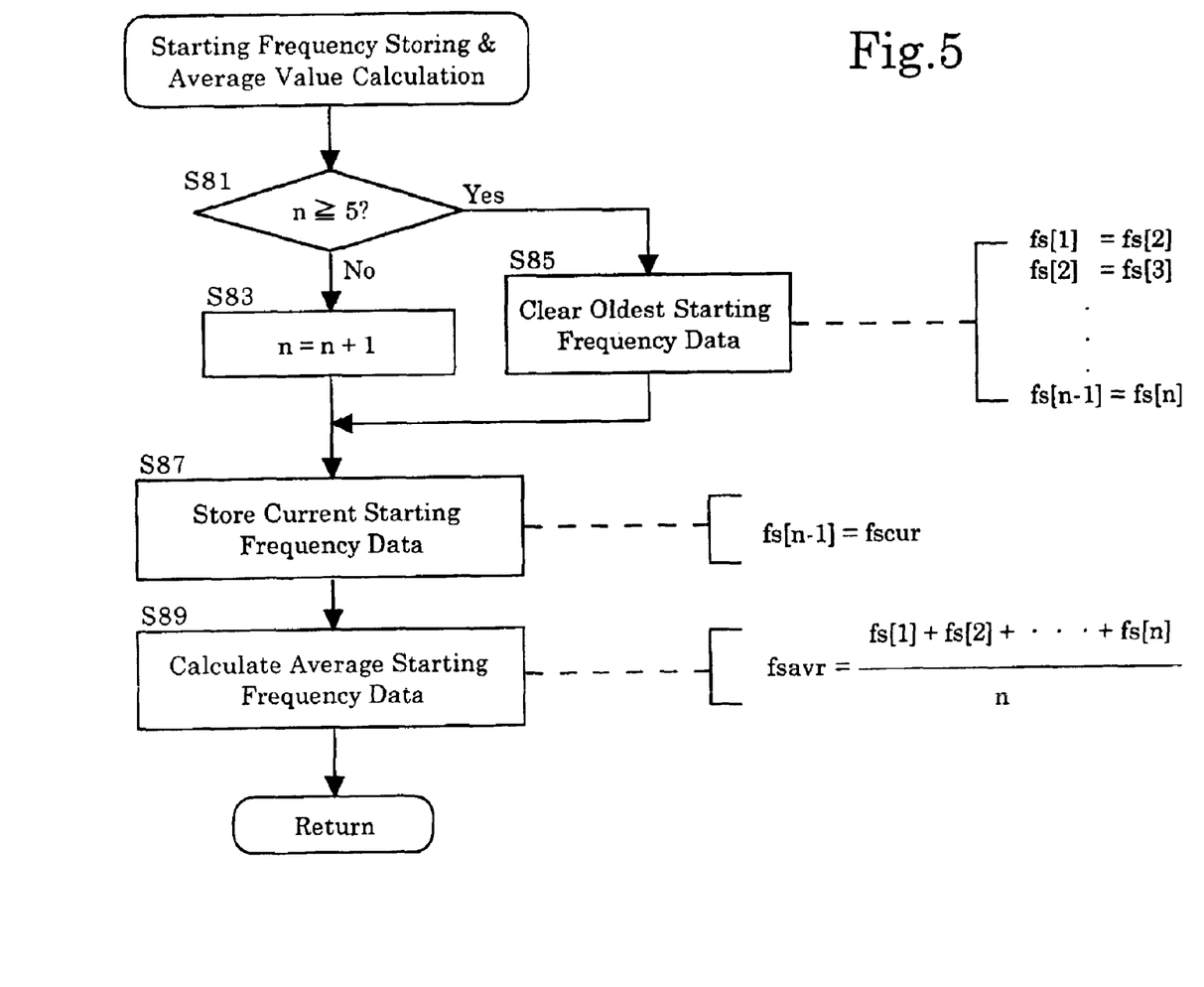
FIG. 5 is a flow chart for a starting frequency storing and average value calculating process shown in FIG. 4B.

The starting frequency storing and average value calculating process that is performed at step S77 will be hereinafter discussed in detail with reference to the flow chart shown in FIG. 5. In this process, firstly it is determined whether the variable n, which indicates the number of the starting frequency data stored in the EEPROM 23, is equal to or greater than five (step S81). In this particular embodiment, the maximum number of data on the starting frequency which can be stored in the EEPROM 23 is five. Namely, it is determined at step S81 whether the starting frequency data have already been stored up to the maximum number of data in the EEPROM 23.

If the variable n is smaller than five (if NO at step S81), the variable n is increased by one (step S83). Subsequently, the current starting frequency data fscur is stored as the starting frequency data fs[n] (i.e., the "n"th starting frequency data fs) (step S87), and subsequently an average starting frequency data fsavr is calculated from all the starting frequency data stored in the EEPROM 23 (step S89). Thereafter control returns.

If the variable n is equal to or greater than five (if YES at step S81), the oldest (first) starting frequency data fs[1] stored in the EEPROM 23 is cleared while the second, third, fourth and fifth starting frequency data fs[2], fs[3], fs[4] and fs[5] are re-stored as the first, second, third and fourth starting frequency data fs[1], fs[2], fs[3] and fs[4] in the EEPROM 23, respectively, so as to store the current starting frequency data as the fifth starting frequency data fs[5] in the EEPROM 23 at all times (step S85). Subsequently, the current starting frequency data fscur is stored as the starting frequency data fs[5] (step S87), and subsequently the average starting frequency data fsavr is calculated from all the starting frequency data stored in the EEPROM 23 (step S89). Thereafter control returns.

Figure 6:
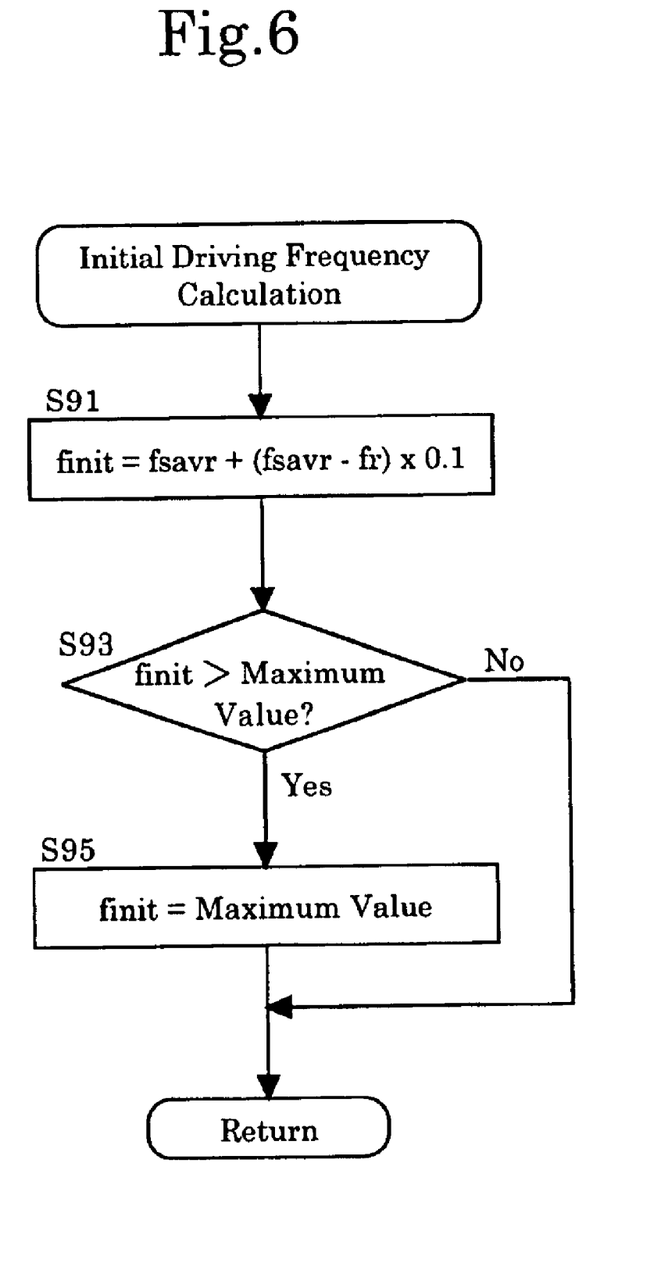
FIG. 6 is a flow chart for an initial drive frequency calculation process shown in FIG. 3.

The initial drive frequency calculation process that is performed at step S31 will be hereinafter discussed in detail with reference to the flow chart shown in FIG. 6. In this process, firstly the average starting frequency data fsavr of all the starting frequency data fs[n] and the resonance frequency fr are read from the EEPROM 23 to calculate the initial drive frequency data finit from the following equation:

$$finit = fsavr + (fsavr - fr) \times 0.1 \quad \text{(step S91)}.$$

Subsequently, it is determined whether the calculated initial drive frequency data finit is greater than the maximum frequency in the controllable frequency range (step S93). If the calculated initial drive frequency data finit is greater than the maximum frequency in the controllable frequency range (if YES at step S93), the initial drive frequency data finit is re-set to the maximum in the controllable frequency range (step S95), and subsequently control returns. On the other hand, if the calculated initial drive frequency data finit is equal to or smaller than the maximum frequency in the controllable frequency range (if NO at step S93), control skips the operation at step S95 and therefore returns.

Figure 7:
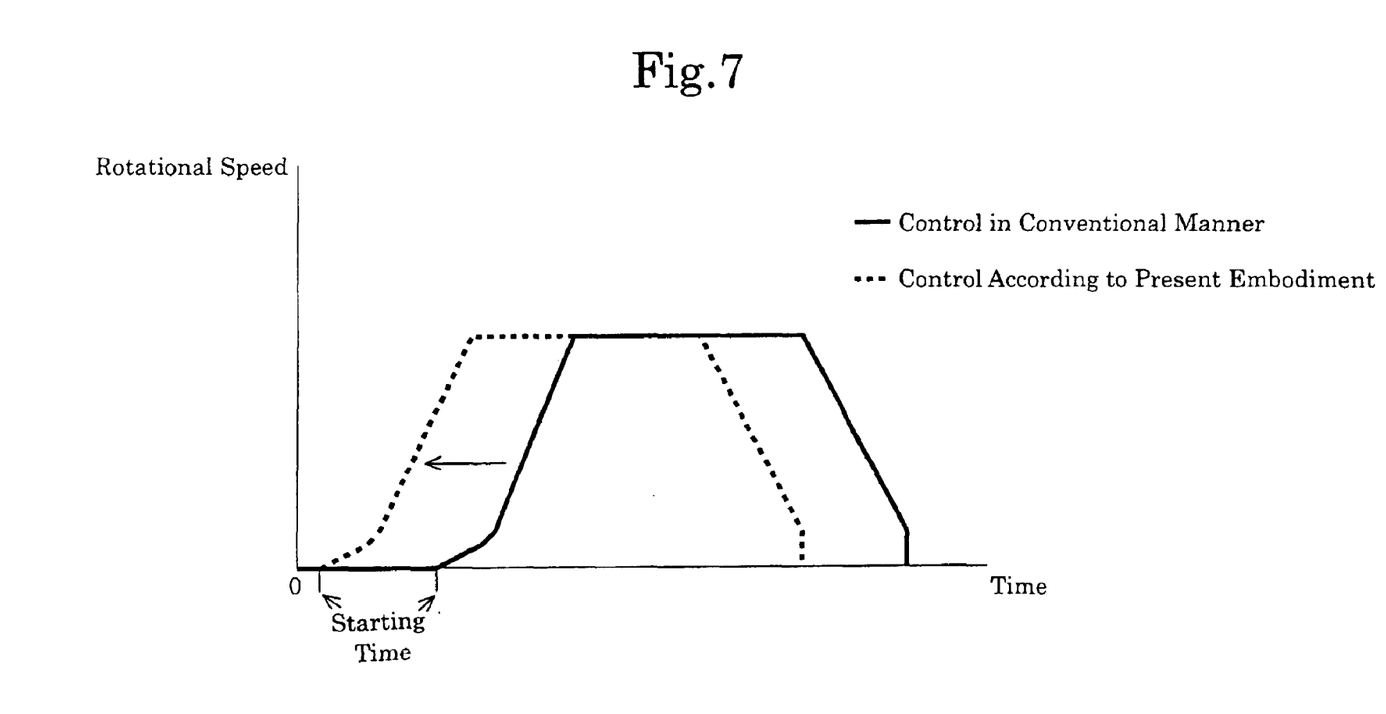
FIG. 7 is a graph showing a variation in the rotational speed of the ultrasonic motor in time sequence according to the present embodiment of the ultrasonic-motor control system, and a variation in the rotational speed of the ultrasonic motor in time sequence according to a conventional control system.

Determining the initial drive frequency data finit in the above described manner makes it possible to reduce the starting time of the ultrasonic motor 10, as compared with the conventional case where the drive frequency sweep operation is carried out from the maximum drive frequency at every time (see FIG. 7).

Although the initial drive frequency data finit is calculated from the above equation "finit=fsavr+(fsavr−fr)×0.1" in the present embodiment of the ultrasonic-motor control system, the initial drive frequency data finit can be set to a drive frequency which is greater than the average starting frequency data fsavr by a predetermined ratio, e.g., to a drive frequency of the average starting frequency data fsavr multiplied by 1.1.

An alternative embodiment of the motor-drive controlling operation performed by the lens CPU 20 will be discussed in detail with reference to the flow charts shown in FIGS. 9 through 11B. In this alternative embodiment, the RAM 20c is used as a memory for the various operations instead of the EEPROM 23, and the EEPROM 23 is used as a back-up memory.

Figure 9:
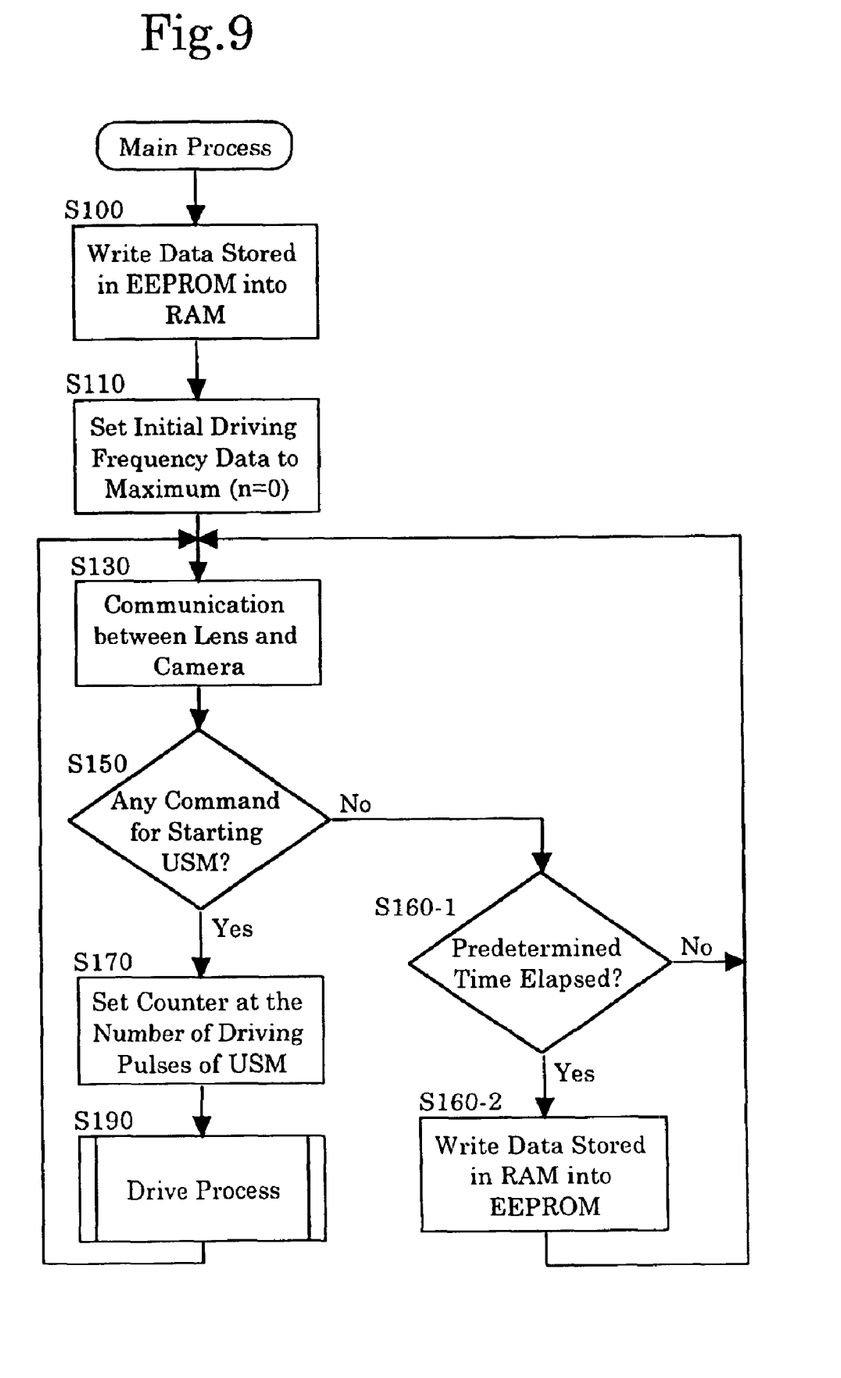
FIG. 9 is a flow chart for another embodiment of a main process of the ultrasonic-motor control system shown in FIG. 1.

FIG. 9 is a flow chart for the main process according to the alternative embodiment. In the main process, firstly control data is read from the EEPROM 23, and the read control data is stored in the RAM 20c. The control data includes the starting frequency data fs[n], the average starting frequency data fsavr, the resonance frequency fr, the initial drive frequency data finit, the ambient temperature data, and the rotational speed data.

Upon the control data being stored in the RAM 20c, control proceeds to step S110. Steps S110, S130, S150, S170 and S190 correspond to steps S11, S13, S15, S17 and S19, and the description thereof are therefore omitted. Steps S160-1 and S160-2, which are not present in FIG. 2, will herein be described. Control proceeds to step S160-1 from step S150 (S150, NO) when no command to start the ultrasonic motor 10 has been input to the lens CPU 20. In step S160-1, it is determined whether a predetermined time has elapsed in a state where no command has been input to the lens CPU 20. If a predetermined time has not yet elapsed, control returns to step S130 (S160, N; S130). If a predetermined time has elapsed, the control data stored in the RAM 20c is written into the EEPROM 23, and control returns to step S130 (S160-1, Y; S160-2; S130).

Figure 3:
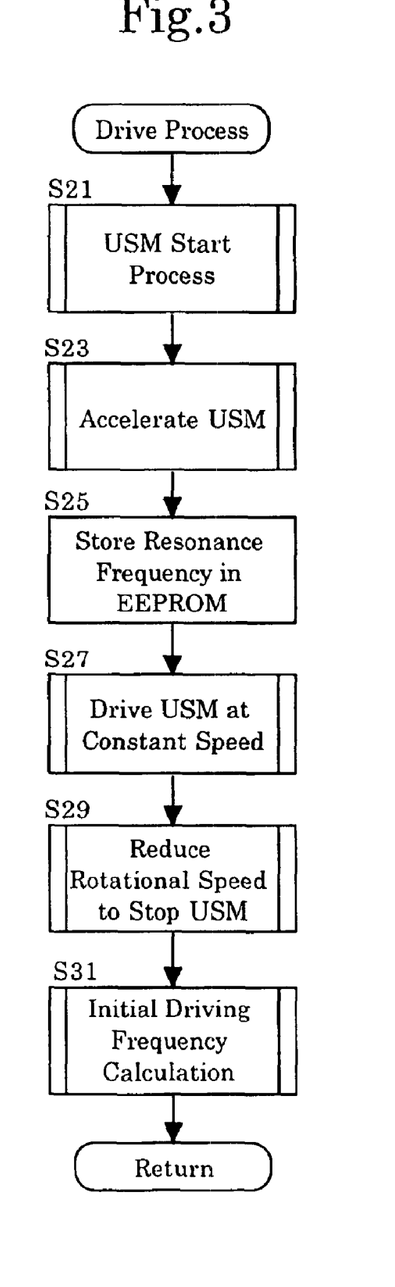
FIG. 3 is a flow chart for a drive process shown in FIG. 2.
Figure 10:
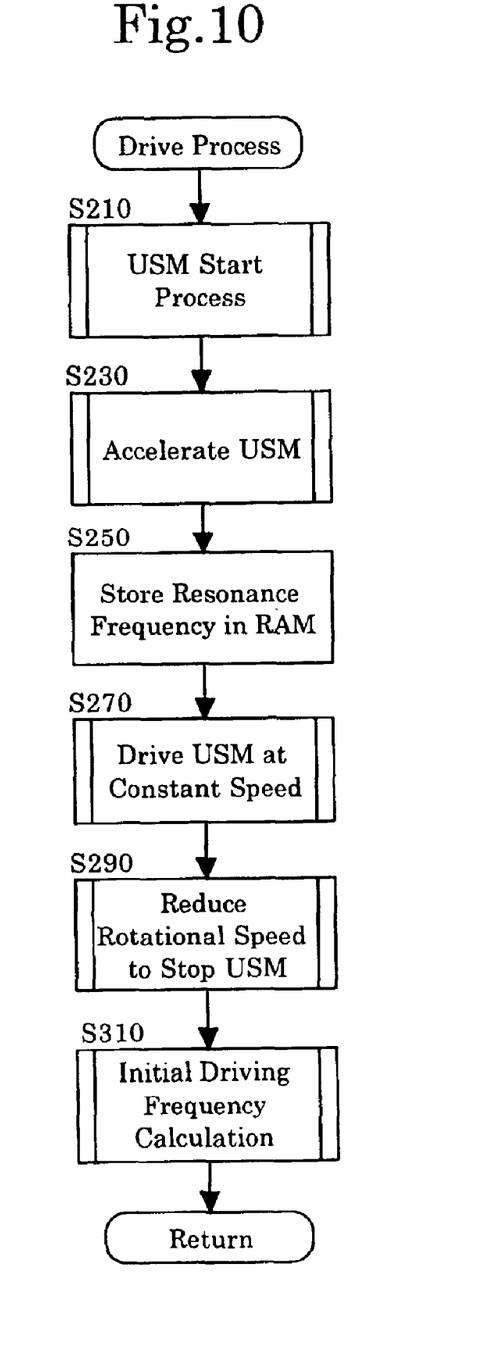
FIG. 10 is a flow chart for a drive process shown in FIG. 9.

FIG. 10 is a flow chart for a drive process shown in FIG. 9, and is similar to FIG. 3. In the drive process, steps S210, S230, S270, S290 and S310 correspond to steps S21, S23, S27, S29 and S31 of FIG. 3. The process shown in step S250, the resonance frequency data fr is stored in the RAM 20c instead of the EEPROM 23, which differs from step S25 of FIG. 3.

Figure 4A:
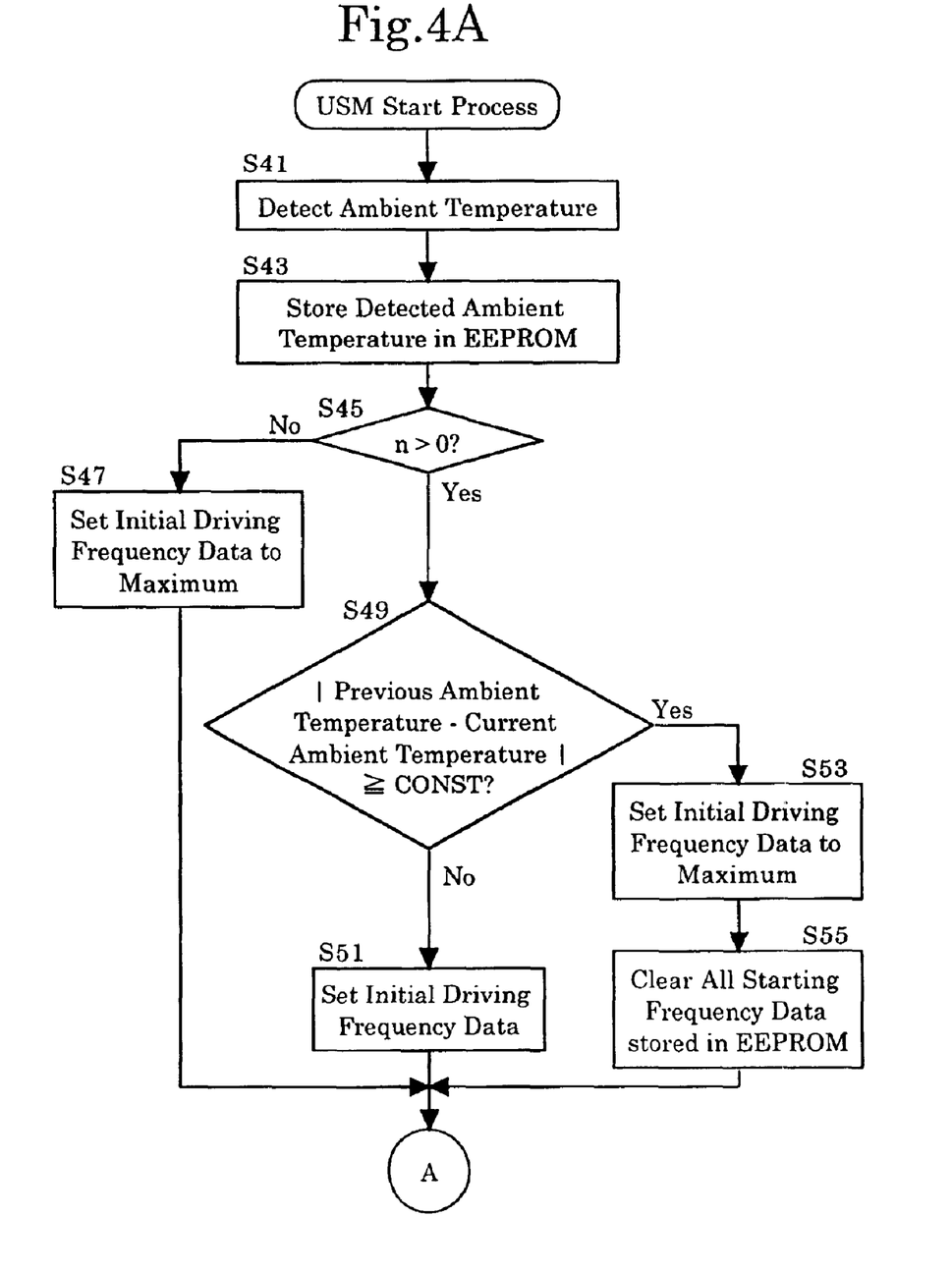
FIG. 4A is the first half of a flow chart for ultrasonic motor start process shown in FIG. 3.
Figure 4B:
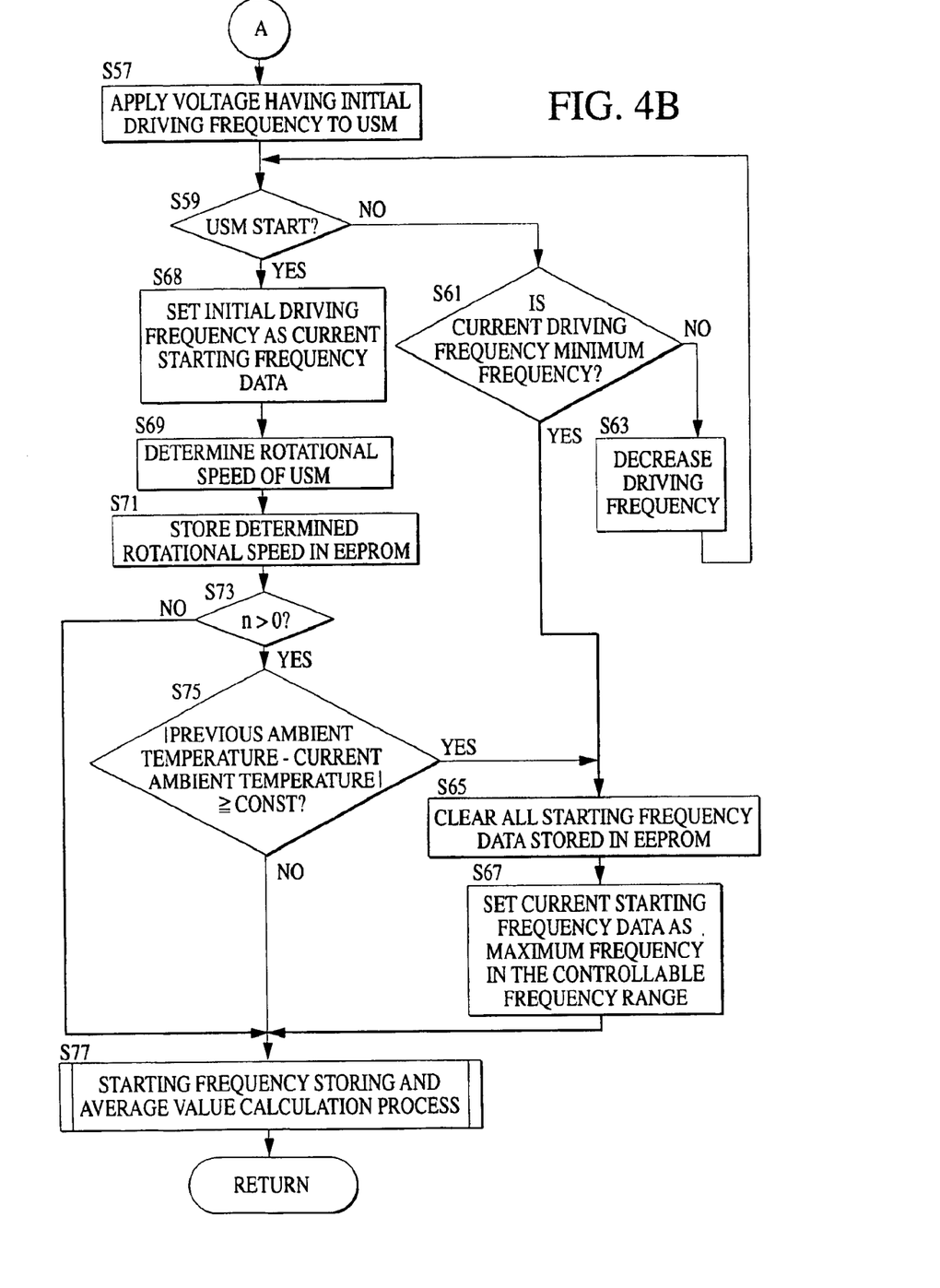
FIG. 4B is the latter half of the flow chart for ultrasonic motor start process shown in FIG. 3.
Figure 11A:
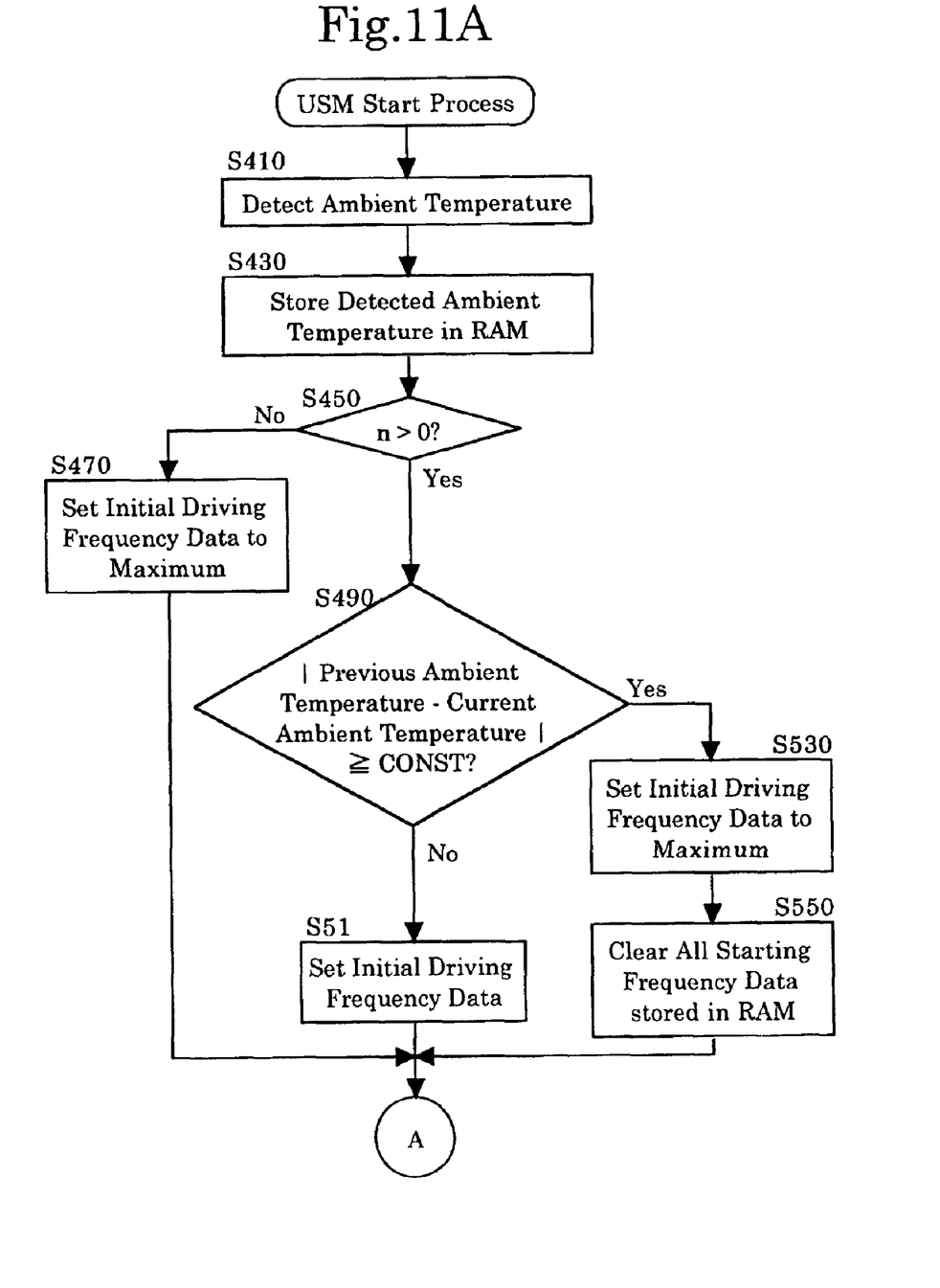
FIG. 11A is the first half of a flow chart for ultrasonic motor start process shown in FIG. 10.
Figure 11B:
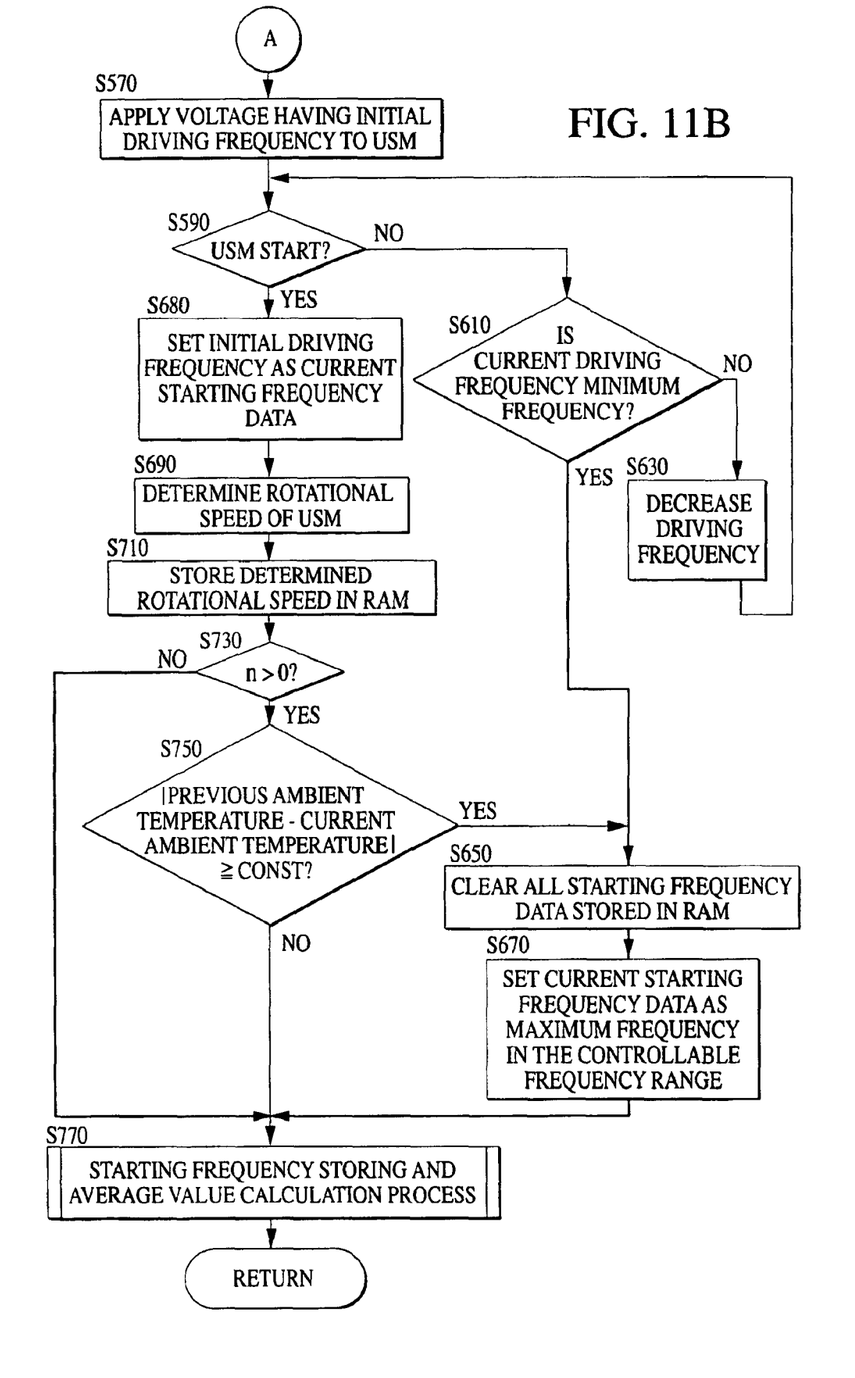
FIG. 11B is the latter half of the flow chart for ultrasonic motor start process shown in FIG. 10.

FIGS. 11A and 11B are flow charts for the ultrasonic motor start process (USM Start Process) shown in FIG. 10, and correspond to FIGS. 4A and 4B. In FIG. 11A, steps S410, S450, S470, S490, S510 and S530 correspond to steps S41, S45, S47, 549, S51 and S53 of FIG. 4A. Likewise, in FIG. 11B, steps S570, S680, S590, S610, S630, S670, S690, S730, S750 and S770 correspond to steps S57, S59, S61, S63, S67 S68, S69, S73, S75 and S77 of FIG. 4B. Only steps S430 and S550 of FIG. 11A differ from FIG. 4A, and only steps S650 and S710 differ from FIG. 4B. In step S430, the detected ambient temperature is stored in the RAM 20c instead of the EEPROM 23. Furthermore, in steps S550 and S650, the starting frequency data is cleared from the RAM 20c instead of the EEPROM 23. In step S710, the determined rotational speed is stored in the RAM 20c instead of the EEPROM 23.

If the control data is read from and written into the RAM 20c, as described above, the control time is faster than when the EEPROM 23 is used, and hence utilizing the RAM 20c in this way is more practical.

Note that when the power supply is turned off or if no operations are performed within a predetermined amount of time, since the peripheral environment can change, an embodiment can also be provided wherein all of the data is cleared. In such a case, all of the data can be stored and restored in the RAM 20c, so that the EEPROM 23 would not be necessary.

Although an AF lens group of a camera system is driven by the ultrasonic motor 10 in the above described embodiment of the ultrasonic-motor control system, any other elements such as a movable lens group for zooming provided in a zoom lens barrel or a movable element provided in other optical instrument can be driven by the ultrasonic-motor. The ultrasonic-motor control system according to the present invention can be used in a more effective manner if applied to an electronic instrument in which the ultrasonic motor needs to start, stop and again start frequently.

As can be understood from the above descriptions, according to the ultrasonic-motor control system to which the present invention is applied, the ultrasonic motor can reliably be made to start rotating at a drive frequency higher than the resonance frequency while reducing the starting time of the ultrasonic motor 10. Furthermore, according to the ultrasonic-motor control system to which the present invention is applied, the ultrasonic motor can be reliably started and driven with stability even if the resonance frequency varies due to a variation in the ambient temperature and/or a variation in the load acting on the ultrasonic motor.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An ultrasonic-motor control system comprising:
    an ultrasonic motor;
    a controller which starts said ultrasonic motor by changing a drive frequency of said ultrasonic motor from an initial drive frequency;
    a calculator that calculates an initial drive frequency data;
    a setting device which sets the initial drive frequency based on the initial drive frequency data at a subsequent commencement of driving of said ultrasonic motor; and
    a frequency data storing device in which the drive frequency at the commencement of rotation of said ultrasonic motor is stored as starting frequency data each time said ultrasonic motor starts;
    wherein said calculator calculates an average of all said starting frequency data stored in said frequency data storing device, and calculates the initial drive frequency data using the average.

2. The ultrasonic-motor control system according to claim 1, wherein said controller starts said ultrasonic motor by reducing a drive frequency of said ultrasonic motor from an initial drive frequency.

3. The ultrasonic-motor control system according to claim 1, wherein said frequency data storing device stores a resonance frequency data of said ultrasonic motor; and wherein said calculator utilizes the resonance frequency data to calculate a value which is added to the average in order to obtain the initial drive frequency data.

4. The ultrasonic-motor control system according to claim 3, wherein each time a rotational speed of said ultrasonic motor reaches a maximum rotational speed, said frequency data storing device stores a drive frequency as the resonance frequency data.

5. The ultrasonic-motor control system according to claim 1, wherein the initial drive frequency data is greater than the average by a predetermined ratio.

6. The ultrasonic-motor control system according to claim 1, wherein said setting device sets the initial drive frequency to a maximum value in a controllable frequency range of said controller when none of the starting frequency data is stored in said frequency data storing device.

7. The ultrasonic-motor control system according to claim 1, wherein when said ultrasonic motor does not start though said controller decreases the drive frequency of said ultrasonic motor to a minimum frequency in a controllable frequency range of said controller, said controller clears all of the starting frequency data stored in said frequency data storing device, and said setting device sets the initial drive frequency to a maximum value in a controllable frequency range of said controller.

8. The ultrasonic-motor control system according to claim 1, further comprising:
    a rotational speed determiner which determines a rotational speed of said ultrasonic motor, upon a lapse of a predetermined time from the commencement of rotation of said ultrasonic motor, each time said ultrasonic motor starts;
    a rotational speed storing device in which the rotational speed is stored as speed data, wherein at least a previous speed data and a current speed data are stored in said rotational speed storing device; and
    a determining device which determines whether a speed-data difference between the previous speed data and the current speed data is one of equal to and greater than a predetermined value;
    wherein said controller clears all of the starting frequency data stored in said frequency data storing device when said determining device determines that the speed-data difference is one of equal to and greater than the predetermined value.

9. The ultrasonic-motor control system according to claim 8, wherein said setting device sets the initial drive frequency to a maximum value in a controllable frequency range of said controller when none of the starting frequency data is stored in said frequency data storing device.

10. The ultrasonic-motor control system according to claim 8, further comprising:
    a temperature sensor for sensing an ambient temperature of said ultrasonic motor before each time said controller starts said ultrasonic motor; and
    a temperature data storing device in which the ambient temperature is stored as temperature data, wherein at least a previous temperature data and a current temperature data are stored in said temperature data storing device;
    wherein said determining device determines whether a temperature-data difference between the previous temperature data and the current temperature data is one of equal to and greater than a predetermined value,
    wherein said controller clears all of the starting frequency data stored in said frequency data storing device when said determining device determines that the temperature-data difference is one of equal to and greater than the predetermined value.

11. The ultrasonic-motor control system according to claim 10, wherein said setting device sets the initial drive frequency to a maximum value in a controllable frequency range of said controller when none of the starting frequency data is stored in said frequency data storing device.

12. The ultrasonic-motor control system according to claim 1, further comprising:

a temperature sensor for sensing an ambient temperature of said ultrasonic motor before each time said controller starts said ultrasonic motor;

a temperature data storing device in which the ambient temperature is stored as temperature data, wherein at least a previous temperature data and a current temperature data are stored in said temperature data storing device; and a determining device which determines whether a difference between the previous temperature data and the current temperature data is one of equal to and greater than a predetermined value;

wherein said controller clears all of the starting frequency data stored in said frequency data storing device when said determining device determines that the difference is one of equal to and greater than the predetermined value.

13. The ultrasonic-motor control system according to claim 12, wherein said setting device sets the initial drive frequency to a maximum value in a controllable frequency range of said controller when none of the starting frequency data is stored in said frequency data storing device.

14. The ultrasonic-motor control system according to claim 1, wherein the initial drive frequency data is stored in said frequency data storing device.

15. The ultrasonic-motor control system according to claim 1, wherein said frequency data storing device stores the current starting frequency data and a predetermined number of previous starting frequency data.

16. The ultrasonic-motor control system according to claim 1, wherein said setting device compares the calculated initial drive frequency with a maximum drive frequency in a controllable frequency range of said controller, and wherein said setting device sets the initial drive frequency to the maximum drive frequency when the calculated initial drive frequency is higher than the maximum drive frequency.

17. The ultrasonic-motor control system according to claim 1, wherein said ultrasonic-motor control system is incorporated in a camera system.

* * * * *